Patented June 3, 1947

2,421,569

UNITED STATES PATENT OFFICE 2,421,569

INSECTICIDE

Frederick B. La Forge, Arlington, Va., and William F. Barthel, College Park, Md., assignors to United States of America, as represented by the Secretary of Agriculture No Drawing. Application October 4, 1944, Serial No. 557,214

8 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticidal compositions containing pyrethrum and has for its object the provision of an improved composition of this type. This invention further relates to the synthesis of a new compound, namely, 3,4-methylenedioxybenzyl n-propyl ether, which is particularly useful when employed in conjunction with pyrethrins because of the resulting synergistic action and also when employed as a solvent.

Insecticidal compositions containing pyrethrum are widely used to combat insect pests, such as flies, mosquitoes, gnats, and the like. Frequently, the pyrethrum is employed in a solvent of the hydrocarbon or mineral oil type, such as odorless kerosene, naphtha, and so forth. Also, it is employed in a solvent of liquefied gases, such as dichlorodifluoromethane, methyl chloride, and so forth. While these insecticidal compositions have good toxic properties and are well suited for the control of household insects and the like, they are expensive.

We have found that a new compound, namely, 3,4-methylenedioxybenzyl n-propyl ether, which is represented by the formula

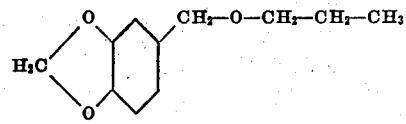

while possessing little or no insecticidal properties in itself increases the toxicity of the pyrethrins to a decidedly advantageous extent. Thus, we found that 3,4-methylenedioxybenzyl n-propyl ether, when incorporated with pyrethrum in an appropriate solvent, yields an insecticidal composition which is more effective against the ordinary housefly than can be accounted for on the basis of the pyrethrin content and 3,4-methylenedioxybenzyl n-propyl ether content. Also, we have found that 3,4-methylenedioxybenzyl n-propyl ether is a good solvent for dichlorodiphenyltrichloroethanes, and in particular, DDT, which is known to be toxic to household insects, but which is insoluble in certain liquefied gases, such as dichlorodifluoromethane. This solvent action is so great that 3,4-methylenedioxybenzyl n-propyl ether may be used to keep dichlorodiphenyltrichloroethane in solution either with or without the pyrethrins depending on the purpose of the insecticide in the liquefied gas.

We prefer as the insecticidal composition a combination of 3,4-methylenedioxybenzyl n-propyl ether and the pyrethrins in either odorless kerosene or dichlorodifluoromethane. However, we do not restrict our invention to this composition, and the new insecticidal ingredients may be used in other solvents and in combination with other insecticides, such as organic thiocyanates, rotenone, derris, lonchocarpus, and the like.

3,4-Methylenedioxybenzyl n-propyl ether, a new compound, may be readily prepared by the Williamson synthesis, as indicated by the following scheme:

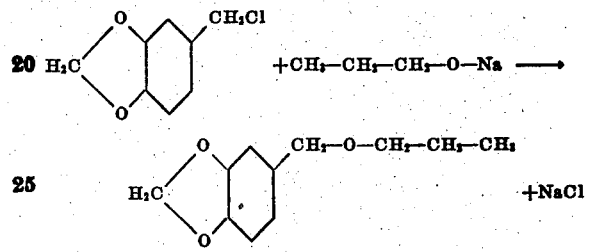

The procedure used for preparation was as follows: 0.7 gms. of sodium were dissolved in 15 ml. of n-propyl alcohol and 5.0 gms. of 3,4-methylenedioxybenzylchloride were added. Sodium chloride began to separate immediately. The reaction mixture was boiled for 4 hours and then poured into 50 ml. of water. The solution was cooled and the new compound was extracted with ethyl ether. The ethyl ether solution was washed repeatedly with water to remove any n-propyl alcohol that had been extracted. The solution was dried and the solvent evaporated. When distilled at 23 mm., 3,4-methylenedioxybenzyl n-propyl ether boiled at 157°–158° C. The yield was 5 gms. Combustion analysis for carbon and hydrogen gave values of 67.70% for carbon and 7.52% for hydrogen, which agree with the theory of 68.02% and 7.27%, respectively. The refractive index at 27° C. for the yellow sodium line was found to be 1.5132.

The efficiency of 3,4-methylenedioxybenzyl n-propyl ether is shown by the following results:

1. A refined kerosene solution containing 1% of this compound alone gave a 1% kill of houseflies after 24 hours.

2. A refined kerosene solution containing 0.05% of pyrethrins alone gave a kill of 20% in 24 hours.

3. A refined kerosene solution containing 1% of the above new compound and, in addition, 0.05% of pyrethrins gave a kill of 68% after 24 hours.

It is thus obvious that a very small concentration of the compound, which in itself is ineffective, gives a pronounced increase in the killing power of the diluted pyrethrin solution. This killing power approximates that of the average commercial fly spray which contains twice the amount of pyrethrins used in the above test. This results in a considerable saving in the use of pyrethrins.

The above example is by illustration only and the amount and proportion of 3,4-methylenedioxybenzyl n-propyl ether and the pyrethrins may be varied over a wide range from 0.05 to 1 part by weight of pyrethrins, from 1 to 20 parts by weight of 3,4-methylenedioxybenzyl n-propyl ether, and from 98.95 to 79 parts by weight of refined kerosene.

Having thus described our invention, we claim:

1. An insecticidal composition comprising pyrethrum and 3,4-methylenedioxybenzyl n-propyl ether as a synergist therefor.

2. An insecticidal composition comprising pyrethrum and 3,4-methylenedioxybenzyl n-propyl ether as a synergist therefor, dissolved in a mutual solvent.

3. An insecticidal composition comprising pyrethrum and 3,4-methylenedioxybenzyl n-propyl ether as a synergist therefor, dissolved in a mineral oil base.

4. An insecticidal composition comprising pyrethrum and 3,4-methylenedioxybenzyl n-propyl ether as a synergist therefor, dissolved in dichlorodifluoromethane.

5. An insecticidal composition comprising from 0.05 to 1 part by weight of pyrethrins and from 1 to 20 parts by weight of 3,4-methylenedioxybenzyl n-propyl ether, dissolved in 98.95 to 79 parts by weight of kerosene.

6. An insecticidal composition comprising dichlorodiphenyltrichloroethane dissolved in 3,4-methylenedioxybenzyl n-propyl ether.

7. An insecticidal composition comprising a solution of dichlorodiphenyltrichloroethane, 3,4-methylenedioxybenzyl n-propyl ether, and dichlorodifluoromethane.

8. An insecticidal composition comprising a solution of pyrethrum, 3,4-methylenedioxybenzyl n-propyl ether as a synergist therefor, dichlorodiphenyltrichloroethane, and dichlorodifluoromethane.

FREDERICK B. LA FORGE.
WILLIAM F. BARTHEL.

REFERENCES CITED

The following references are of record in the file of this patent:

UNITED STATES PATENTS

| Number | Name | Date |
|---|---|---|
| 2,251,287 | Lott | Aug. 5, 1941 |
| 2,326,350 | Gertler et al. | Aug. 10, 1943 |

OTHER REFERENCES

Beilstein, vol. 19, Vierte Auflage, 1934 ed., page 73.